(12) United States Patent  (10) Patent No.: US 8,843,393 B2
Beavers et al.  (45) Date of Patent: Sep. 23, 2014

(54) METHOD AND SYSTEM FOR IMPROVED MOBILE DEVICE ADVERTISEMENT

(75) Inventors: Wade Beavers, Rochester, MN (US); David Borrillo, Rochester, MN (US); Joseph Sriver, Minneapolis, MN (US)

(73) Assignee: DoApp, Inc., Rochester, MN (US)

( * ) Notice: Subject to any disclaimer, the term of this patent is extended or adjusted under 35 U.S.C. 154(b) by 843 days.

(21) Appl. No.: 12/606,008

(22) Filed: Oct. 26, 2009

(65) Prior Publication Data

US 2010/0125500 A1 May 20, 2010

Related U.S. Application Data

(60) Provisional application No. 61/115,629, filed on Nov. 18, 2008.

(51) Int. Cl.
*G06Q 30/00* (2012.01)
*G06Q 30/02* (2012.01)

(52) U.S. Cl.
CPC ............ *G06Q 30/0253* (2013.01); *G06Q 30/02* (2013.01)
USPC ........................................................ 705/14.4

(58) Field of Classification Search
None
See application file for complete search history.

(56) References Cited

U.S. PATENT DOCUMENTS

| | | | |
|---|---|---|---|
| 5,992,888 A * | 11/1999 | North et al. | 283/56 |
| 7,565,332 B2 | 7/2009 | Williams et al. | |
| 2001/0049636 A1 | 12/2001 | Hudda et al. | |
| 2002/0052780 A1 * | 5/2002 | Landesmann | 705/14 |
| 2003/0105667 A1 * | 6/2003 | Millikan | 705/14 |
| 2005/0049914 A1 * | 3/2005 | Parish | 705/14 |
| 2006/0036502 A1 | 2/2006 | Farrell | |
| 2006/0106674 A1 | 5/2006 | Muller | |
| 2006/0277107 A1 * | 12/2006 | Beal et al. | 705/14 |
| 2007/0011048 A1 * | 1/2007 | Naito | 705/14 |
| 2008/0082426 A1 | 4/2008 | Gokturk et al. | |
| 2008/0097871 A1 | 4/2008 | Williams et al. | |
| 2008/0235123 A1 | 9/2008 | Olliphant et al. | |
| 2008/0267504 A1 | 10/2008 | Schloter et al. | |
| 2008/0300980 A1 | 12/2008 | Benjamin et al. | |
| 2009/0012880 A1 * | 1/2009 | Tortola | 705/27 |
| 2009/0144066 A1 | 6/2009 | Van Luchene et al. | |
| 2009/0235149 A1 | 9/2009 | Frohwein | |
| 2009/0248996 A1 | 10/2009 | Mandyam et al. | |
| 2009/0309711 A1 * | 12/2009 | Adappa et al. | 340/501 |
| 2010/0042469 A1 * | 2/2010 | Chandrasekar et al. | 705/10 |

(Continued)

OTHER PUBLICATIONS

Co-pending U.S. Appl. No. 12/121,652, filed May 15, 2008.

(Continued)

*Primary Examiner* — Matthew T Sittner
(74) *Attorney, Agent, or Firm* — Schwegman Lundberg & Woessner, P.A.

(57) ABSTRACT

A method and system for displaying targeted advertisements. The method includes executing a monitoring application on a mobile device, the mobile device configured with a sensor. The method includes detecting a start of a user purchase decision making process via a sensor reading, wherein the sensor reading includes at least one of: a search query, a user command for the mobile device, a user geographical location, a local time, a user phone call, a user local environment, and a user behavior history. The method includes selecting a relevant ad based on the start of the user purchase decision making process and the sensor reading. The method includes displaying the selected ad to the user during the user purchase decision making process.

20 Claims, 6 Drawing Sheets

(56) References Cited

U.S. PATENT DOCUMENTS

2010/0042470 A1* 2/2010 Chang et al. .................... 705/10
2010/0100445 A1* 4/2010 Flood et al. ................. 705/14.64
2010/0138298 A1* 6/2010 Fitzgerald et al. ......... 705/14.53

OTHER PUBLICATIONS

Co-pending U.S. Appl. No. 12/429,884, filed Apr. 24 2009.
Co-pending U.S. Appl. No. 12/606,018, filed Oct. 26, 2009.
Co-pending U.S. Appl. No. 12/802,525, filed Jun. 7, 2010.
Final Office Action dated Sep. 14, 2009, in Co-Pending U.S. Appl. No. 12/121,652, filed May 15, 2008.
Non-Final Office Action dated Aug. 25, 2010, in Co-Pending U.S. Appl. No. 12/429,884, filed Apr. 24, 2009.
Non-Final Office Action dated Feb. 20, 2009, in Co-Pending U.S. Appl. No. 12/121,652, filed May 15, 2008.
Notice of Allowance dated Jul. 13, 2010, in Co-Pending U.S. Appl. No. 12/121,652, filed May 15, 2008.
Trueposition Partners with GPShopper to Offer Wireless Operators Location-Aware Shopping Services (PR Newswire New York: Mar. 28, 2007).

* cited by examiner

METHOD AND SYSTEM FOR IMPROVED MOBILE DEVICE ADVERTISEMENT

CROSS REFERENCE TO RELATED APPLICATIONS

This application claims priority to provisional application Ser. No. 61/115,629 entitled "METHOD AND SYSTEM FOR IMPROVED MOBILE DEVICE ADVERTISEMENT", filed Nov. 18, 2008, and which is incorporated herein by reference.

BACKGROUND

Online advertising utilizes the Internet and other networks to deliver marketing messages and attract customers. Examples of online advertising on the World Wide Web include contextual advertisements (ads) on search engine results pages, banner ads, Rich Media Ads, social network advertising, advertising networks and e-mail marketing. Such ads can be text-only or include multimedia content such as graphics, animation, and audio. For example, ads can be displayed to users on various computing devices.

Computing devices can include personal computers, workstations, desktop computers, and mobile devices such as cell phones and personal digital assistants (PDAs). Wireless mobile devices can communicate via a wireless network and access the Internet and other networks.

Example ads can be graphical or text-only ads that correspond to the keywords of an Internet search or to the content of the page on which the ad is shown. These ads share a similar context as the user's search query, and thus are more relevant to the user. For example, a search query for "flowers" might return an advertisement for a florist's website.

Unfortunately, the growth of online advertising has saturated consumer attention with an overwhelming number of online ads. This reduces an effectiveness of each displayed online ad, usually measured as a conversion rate. To improve conversion rates, advertisers are continuously attempting to improve relevancy of their ads. Ad relevance denotes how well a display ad meets the information need of the user.

Relevance can be improved by only display ads that are similar in context and topic to a user's information need. For example, a user's information needs can be deduced from a search query, a user history, user demographics and characteristics, and any other information known about the user. Online ads are well-suited for specific targeted advertising efforts because the online environment allows for a high level of personalization of displayed ads.

There is an advertising continuum for the extent to which an advertising campaign effectively targets an audience. For example, an ad on an award-winning prime time television show cuts a broad swath across demographics, age, and even language. The types of products that lend themselves to this type of advertising have general appeal to a wide audience. For example, advertising bath soap during a prime time showing of a popular sitcom is an example of this scatter-shot approach.

At the other extreme is advertising tailored to a specific customer or a small set of customers. For example, hand delivering a mailer for a product or service that one or a small number of customers is a tailored approach to advertising.

Thus, there is a need to provide improved targeted advertising on a mobile device.

BRIEF DESCRIPTION OF DRAWINGS

The features and objects of the present disclosure will become more apparent with reference to the following description taken in conjunction with the accompanying drawings wherein like reference numerals denote like elements and in which.

DETAILED DESCRIPTION

Improved targeting of ads on mobile devices by aggregating and analyzing mobile device sensor inputs to determine crucial user decision-making process points. Strategic ads and inducements are then displayed to the user at crucial points during a user decision making process.

Targeted advertising can depend on the media, location, activity, subject, and events surrounding a user interaction. In fact, most advertising has some targeting associated with it. An ad placed in a gardening magazine targets an audience interested in gardening. Similarly, a billboard ad near a major highway targets a set of customers based on location, such as a local car dealership, TV station, or tourist attraction.

Online advertising is particularly suitable to context-sensitive advertising, where ads are selected in response to a user's search query. Furthermore, ads can be personalized based on a statistical model for a class of users. For example, a user's past purchases and search queries can be compared to behavior of other users, and a system can to suggest additional products of interest to a user based on past observed behavior of other users.

Personalization also occurs where a specific customer's behaviors are tracked and analyzed to determine appropriate ads to display. A recommender system collects and analyzes a specific user's behavior (such as purchases and search queries) and can anticipate what they want most. For example, a user might order pizza every Wednesday at noon at the office for an office pizza party. While the recommender system does not know about the weekly office pizza party, it can infer a weekly need for pizza based on past orders and delivery to an office address. The recommender system could provide ads for several different types of pizza every Wednesday morning. The recommender system can also provide ads for social activities, such as bowling or movies, in the hope that the user mentions the ad during lunch with his co-workers.

This is an improvement over prior advertisement models as a better approximation of customer need is being met by the advertiser. However, this model is also more intrusive than prior models. Privacy concerns loom large with these types of extremely personalized recommender systems. Yet these types of systems when combined with the new mobile platform have the greatest potential for improving targeted advertising.

Mobile devices add an element to traditional online advertising models because they provide additional information on a customer's habits. A location-aware device not only can determine all the typical things that an online recommender system can determine, it can also tie these activities to a specific location and time. Furthermore, the mobile device can reveal in extreme detail every behavior of a person. A device that is location-aware can determine where a person is at all times, how long he stays, even where he window shops. Tracking shopping behaviors is now considered an essential part of any major marketing effort and is ubiquitous. However, tracking a customer's purchases reveals nothing about where consumers don't shop or how many places they go before they purchase, where they window shopped, or who they contacted before they did or didn't make a purchase.

For example, assume a woman is shopping for a new lawn mower. She visits a first dealership and calls a friend who is a mechanic. The friend notes that the first dealer's lawn mowers are high-quality but also high-priced and suggests she doesn't need to pay that much for her very tiny lawn. She then goes to a second dealership at lawn mowers there. Again, she calls that mechanic friend who tells her the second dealer is probably too inexpensive and a bad investment. Finally, she ends up at a third dealership and at her friend's suggestion purchases a lawn mower.

With the current techniques, it would be evident that she purchased a lawn mower at the third dealer at 5:00 p.m. But with the new techniques using mobile devices discussed above, a much more through model of the customer's decision making process can be constructed. The mobile device can infer where she didn't make a purchase, determine who she called for advice, how long it took to make a decision, where she stopped in between purchases, how long she spent at each location, how fast she drives, how fast she walks while shopping and whether there is a variation in the pattern based on some environmental factor. Mobile devices that measure g-forces and motion can also determine what mode of transportation is being used. Motion-sensitive devices could even infer the energy levels and mood.

This information could reveal a level of detail about a person that could maximize the effect of advertising in a way that has never been possible. For example, someone has been walking quickly for an hour, where the local weather report indicates the temperature is 85 degrees Fahrenheit and the dew point is 70 degrees Fahrenheit is probably thirsty. The mobile device can detect the person has not purchased any beverages or stopped at any venues offering beverages. The mobile device could spontaneously provide ads to the user for nearby beverage venues. The mobile device can also spontaneously list available nearby beverage venues, such as the closest and cheapest and even provide coupons for a specific beverage.

Furthermore, the mobile device can filter inappropriate beverage options. For example, alcoholic beverages should not be shown to underage and sugar drinks should not be shown to diabetics. Furthermore, someone who doesn't like lemon should not see lemon-based drinks as an option. Thus, the advertising model improves the shopping experience for both the consumer and the advertiser by better aligning their needs.

Furthermore, the advertising model allows rejected choices to be analyzed, understood, and used to provide a better information and product matching experience for the consumer. Anytime a consumer purchases a product, there is an implicit assumption that all other options were rejected. However, in most cases, it is not clear or evident what choices were rejected and what choices were not considered due to lack of information. Having this data provides a unique opportunity for advertisers that could not be otherwise determined.

For example, a customer goes to a first car dealership, a second car dealer, and a car dealership. The customer then returns to the first car dealership before purchasing a car from the second car dealership. This behavior can imply the first car dealership is very close to gaining success and may be able to push the sale through with some strategic advertisement or inducement. When a customer is in the "almost" category, it is the opportune time to drive the sale through. A strategic advertisement or offer from the first car dealership as the customer is returning to the second car dealership could be exactly what is needed to push the consumer over the edge to make the purchase at the first car dealership.

Another element of this model is the use of advertising to meet a consumer need. Rather than spamming the consumer with unnecessary products, the advertising is based on the consumer needs and wants creating a marketplace where consumers see only the advertising they want to see and advertisers target only the consumers that would be most likely to act on the ad.

Another element of the model is the integration of advertising into a mobile device application seamlessly so that it is an integral part of the user experience. Unlike media today where there is ad space or ad time (as in TV or radio), the advertising is part of the application and in fact the application is the advertising. All of the above features contribute to an improved advertising model.

Figure 1A:
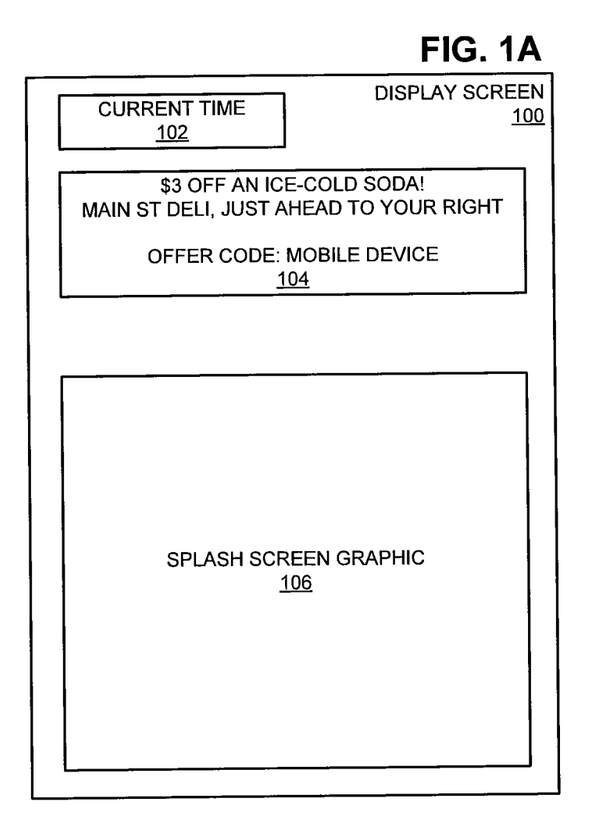
FIG. 1A illustrates a screen shot of a beverage ad on a mobile device.
Figure 2:
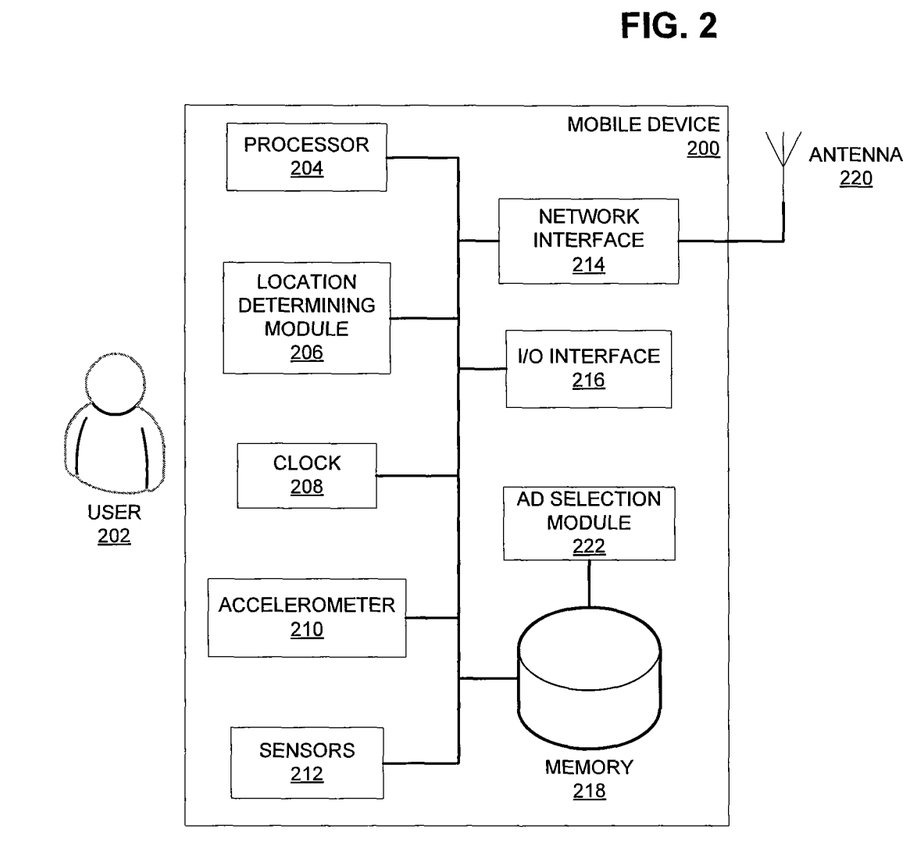
FIG. 2 illustrates a mobile device for improved mobile device advertising.

FIG. 1A illustrates a screen shot of a beverage ad on a mobile device. The screen shot can be displayed on a mobile device display screen. The mobile device can be as illustrated in FIG. 2. For example, the mobile device can be accessible to a user while the user is walking along the street. The mobile device is equipped with a location-sensing device, as discussed below, and determined a local weather condition from the location. In this example, the local conditions are warm and humid. From the location-sensing module, the mobile device has also determined the user is walking from how quickly the user's location is changing.

Responsive to an ad trigger, the mobile device determines that a beverage ad should be displayed to the user. As discussed above, various additional personalization techniques can also be used to select a relevant beverage ad. Here, a soda ad is selected and displayed.

It will be appreciated that the above analysis can also be computed by a server receiving sensor readings from the mobile device.

The display screen 100 can be any display area, such as a liquid crystal display (LCD), touch screen, or any other display area configured to display text or images to the user.

A current time 102 can be displayed. Any other standard information available on a mobile device can be displayed.

An ad 104 can be displayed. The ad 104 can provide a product or service name, a coupon or other discount/enticement, a location of a merchant providing the product, an offer code, or any other information relevant to advertising to the user.

In one embodiment, the mobile device can beep, vibrate, or otherwise obtain the user's attention when the add 104 is triggered and displayed on the display screen 100.

A splash screen graphic 106 can be displayed. For example, the mobile device can allow its keyboard to be locked responsive to a user command or a period of user inactivity. The splash screen graphic 106 can be displayed while the mobile device is locked.

Figure 1B:
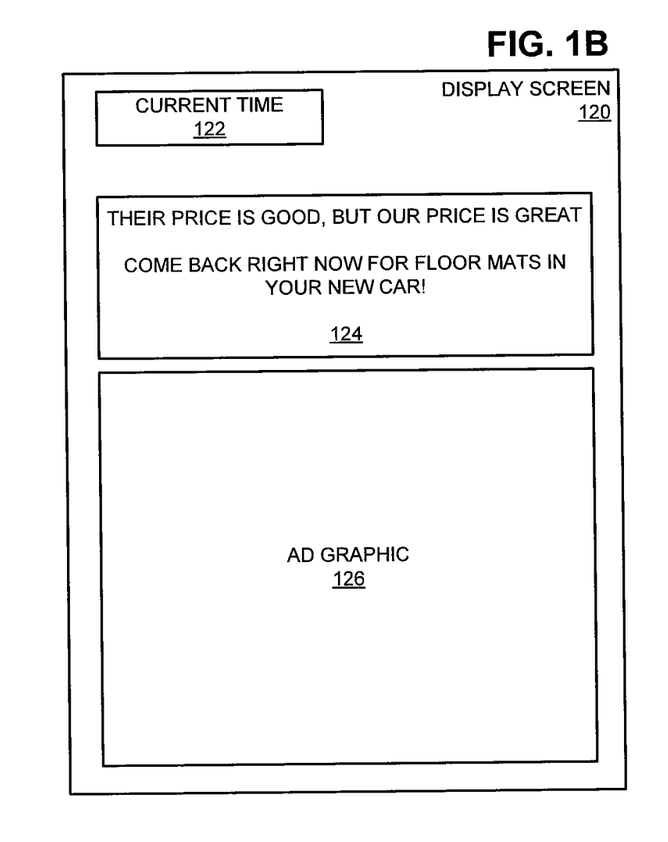
FIG. 1B illustrates a screen shot of an ad displayed at a crucial point in a car purchase decision making process.

FIG. 1B illustrates a screen shot of an ad displayed at a crucial point in a car purchase decision making process. The mobile device can be as illustrated in FIG. 2. As discussed above, the mobile device can be accessible to the user. In this example, the mobile device has determined the user is shopping for a new car. For example, the mobile device can detect the user has visited three car dealerships in the past four hours and conducted several test drives. For example, the mobile device can detect a search query for nearby car dealerships to visit via a wireless data connection. For example, the mobile device can detect phone calls to one or more of the user's contacts who are known to be car experts or enthusiasts.

The above conditions can be an ad trigger, indicating the user has begun a purchase decision making process. If the user then returns to one of the three car dealerships, the mobile device can infer the user is close to making a final purchase decision. This is an ideal time to offer a last-minute discount or other inducement by one of the other two car dealerships.

A current time 122 can be displayed. Any other standard information available on a mobile device can be displayed.

An ad 124 can be designed to overcome last minute resistance and close a sale. For example, when the mobile device detects the user is about to purchase a car at a second dealer, it can display a last-minute inducement ad such as an offer for free floor mats or any similar strategic inducement.

In one example, the ad does not offer any additional discount or merchandise, but rather displays salient facts to convince the user. For example, the user visits a first dealership and expresses a high interest in passenger safety. The ad can include crash ratings of the second dealership's cars versus crash ratings of the first dealership's cars.

It will be appreciated that any content can be displayed in ad 124 to convince the user to change a purchase decision at the last minute.

An ad graphic 126 can be displayed. For example, the ad graphic 126 can be an attractive image or any other multimedia content to convince the user. The ad graphic 126 can depict a free bonus product included if the user purchases the product or service advertised in ad 124.

FIG. 2 illustrates a mobile device for improved mobile device advertising. The mobile device 200 can be a cellular phone, a PDA, or a similar portable device used by a user 202. The mobile device 200 is configured to select relevant ads for display to the user 202 at crucial points during a user purchase decision making process. As discussed above, the mobile device 200 can infer when the user 202 is in a receptive mood to make a purchase, and display relevant ads to influence the purchase.

The mobile device 200 can include a processor 204. The processor 204 can be a general purpose processor configured to execute computer-readable instructions operating the mobile device 200 and associated peripherals, including selecting a relevant ad and inferring a user purchase decision making process. It will be appreciated that any number of processors can be included in the mobile device 200, including specialized processors. The processor 204 can also be configured to execute the playback module 222, as discussed below.

The mobile device 200 can include a location determining module 206. The module 206 can be a GPS receiver module configured to receive GPS signals and calculate a physical location of the mobile device 200 based on the received GPS signals and an internal clock time. The physical location calculation can be optimized by, for example, averaging the GPS signals over time or incorporating a signal from a known nearby location.

Alternatively, the module 206 can calculate a physical location by cellular signal triangulation or via short-range wireless network detection.

The mobile device 200 can include a clock 208. The clock 208 can provide a local time. The clock 208 can also provide an internal time for use with the GPS module. The clock 208 can be periodically updated from a server in communications with the mobile device 200.

The mobile device 200 includes an accelerometer 210. The accelerometer 210 can be configured to detect movement of the mobile device 200 and convert the movement into digital signals transmitted to the processor 204.

The mobile device 200 includes additional sensors 212. Additional sensors can include audio input devices or optical input devices. Audio input devices can include microphones. Optical input devices can include cameras or light sensors. The sensors 212 can be configured to detect appropriate input and convert the input into input signals transmitted to the processor 202.

The mobile device 200 can include a network interface 214. For example, the network interface 214 can communicate with a cellular wireless network, a wired network such as Ethernet, or a short range wireless network such as Bluetooth or Wi-Fi. The mobile device 200 can include multiple network interfaces or a network interface configured to interface with multiple networks. Wireless network interfaces can communicate via an antenna 220.

An Ethernet network allows the mobile device 200 to communicate when plugged in. The mobile device 200 can be assigned an IP address on the wired network. A short-range wireless network can be a Wi-Fi, Wi-Bree or Bluetooth network.

The mobile device 200 can include an input/output interface 216. The interface 216 can receive user inputs from an input device and convert the user inputs into user commands. For example, input devices can include a touch screen display, a keypad, a microphone, an optical device, a pointer device, a scroll wheel, or other input devices.

The interface 216 can also transmit output to an output device in a form accessible to the user 202. For example, output devices can include a touch screen, a display screen, a speaker, an audio-out jack, an electro-mechanical motor for providing tactile output, or other output devices.

The mobile device 200 can include a memory 218. The memory 218 can be read-only or read-write, persistent or volatile storage memory accessible to the processor 204. The memory 218 can store data required by the mobile device 200 for operation and applications for execution.

The mobile device 200 can include an antenna 220. The antenna 220 can be configured to transmit and receive wireless signals from a wireless network.

The mobile device 200 can store an ad selection module 222. The ad selection module 222 can be computer-readable executable code configured to infer when a user 202 is susceptible to advertising from various sensor inputs, as discussed above. The ad selection module 222 then selects a relevant ad for display to the user 202, as discussed above.

In one example embodiment, the ads are stored locally in the memory 218 for quick access. This allows the ads to be displayed regardless of wireless network condition.

Figure 3:
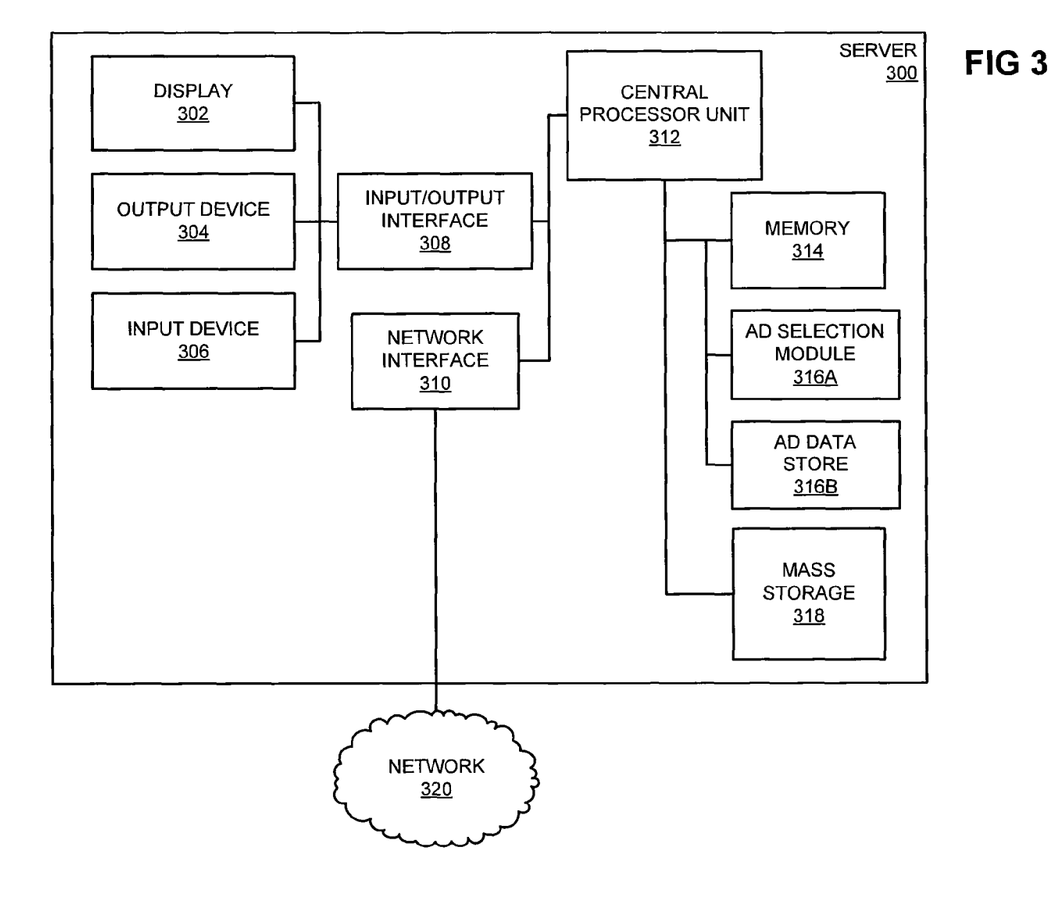
FIG. 3 illustrates an example server for improved mobile device advertising.

In another example embodiment, the ads are stored remotely on a server. The server can be as illustrated in FIG. 3. In this example embodiment, the ad selection can be executed by either the mobile device 200 or the server. Storing the ads on the server allows a much larger number of ads to be available for display and can simplify record keeping of which ads were displayed to which users.

FIG. 3 illustrates an example server for improved mobile device advertising. The server 300 can interact with a user via a workstation over a network or a mobile device over a wireless network to provide ads to users. For example, the server 300 can be a standard computing server configured to communicate with workstations and mobile devices over a plurality of networks. Alternatively, the server 300 can be any computing device.

The server 300 includes a display 302. The display 302 can be equipment that displays viewable images, graphics, and text generated by the server 300 to a user. For example, the display 302 can be a cathode ray tube or a flat panel display such as a TFT LCD. The display 302 includes a display surface, circuitry to generate a viewable picture from electronic signals sent by the server 300, and an enclosure or case. The display 302 can interface with an input/output interface 308, which converts data from a central processor unit 312 to a format compatible with the display 302.

The server 300 includes one or more output devices 304. The output device 304 can be any hardware used to communicate outputs to the user. For example, the output device 304 can be audio speakers and printers or other devices for providing output.

The server 300 includes one or more input devices 306. The input device 306 can be any computer hardware used to receive inputs from the user. The input device 306 can include keyboards, mouse pointer devices, microphones, scanners, video and digital cameras, etc.

The server 300 includes an input/output interface 308. The input/output interface 308 can include logic and physical ports used to connect and control peripheral devices, such as output devices 304 and input devices 306. For example, the input/output interface 308 can allow input and output devices 304 and 306 to communicate with the server 300.

The server 300 includes a network interface 310. The network interface 310 includes logic and physical ports used to connect to one or more networks. For example, the network interface 310 can accept a physical network connection and interface between the network and the workstation by translating communications between the two. Example networks can include Ethernet, or other physical network infrastructure. Alternatively, the network interface 310 can be configured to interface with wireless network. Alternatively, the server 300 can include multiple network interfaces for interfacing with multiple networks.

As illustrated, the network interface 310 communicates over a wired network and a cellular network. It will be appreciated that the server 300 can communicate over any combination of wired, wireless, or other networks.

The server 300 includes a central processing unit (CPU) 312. The CPU 312 can be an integrated circuit configured for mass-production and suited for a variety of computing applications. The CPU 312 can sit on a motherboard within the server 300 and control other workstation components. The CPU 312 can communicate with the other workstation components via a bus, a physical interchange, or other communication channel.

The server 300 includes memory 314. The memory 314 can include volatile and non-volatile memory accessible to the CPU 312. The memory can be random access and provide fast access for graphics-related or other calculations. In an alternative, the CPU 312 can include on-board cache memory for faster performance.

The server 300 includes an ad selection module 316A stored in the memory 314. For example, the ad selection module 316A executes on the CPU 312. The ad selection module 316A can select a relevant ad responsive to sensor readings received from a mobile device over the network 320, as discussed above.

The server 300 can include an ad data store 316B. The ad data store 316B can be stored in the memory 314, as illustrated, or in a mass storage 418 (not illustrated). The ad data store 316B can store approved ads for display to the user. The ad data store 316B can further store trigger conditions and appropriate metadata for each approved ad to aid in selecting relevant ads to display.

The server 300 includes mass storage 318. The mass storage 318 can be volatile or non-volatile storage configured to store large amounts of data. The mass storage 318 can be accessible to the CPU 312 via a bus, a physical interchange, or other communication channel. For example, the mass storage 318 can be a hard drive, a RAID array, flash memory, CD-ROMs, DVDs, HD-DVD or Blu-Ray mediums.

The server 300 communicates with a network 230 via the network interface 312. The network 230 can be as discussed. The server 300 can communicate with a mobile device over the cellular network 230.

Alternatively, the network interface 310 can communicate over any network configured to carry digital information. For example, the network interface 310 can communicate over an Ethernet network, the Internet, a wireless network, a cellular data network, or any Local Area Network or Wide Area Network.

Figure 4:
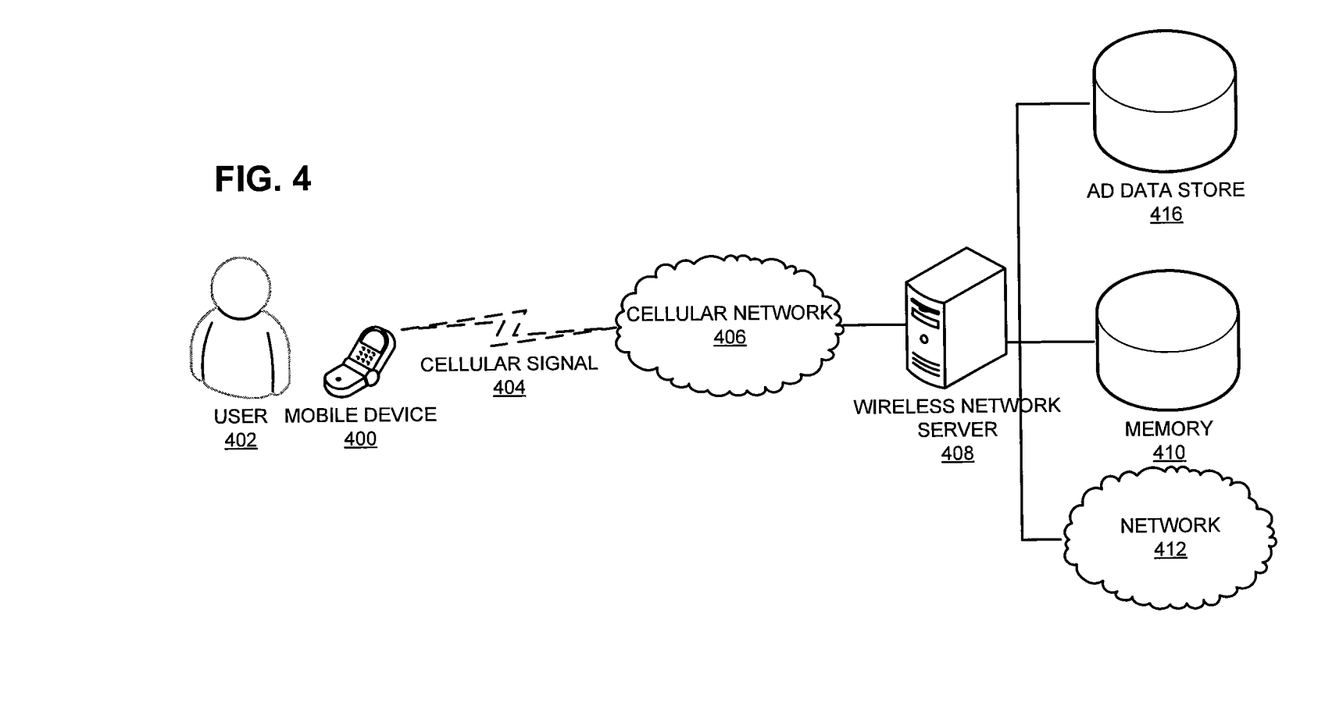
FIG. 4 illustrates an example system for improved mobile device advertising.

FIG. 4 illustrates an example system for improved mobile device advertising. A mobile device 400 is used by a user 402. For example, the mobile device 400 can be a data-capable cellular phone, a wireless Personal Digital Assistant (PDA), or any portable device as illustrated in FIG. 2.

The mobile device 400 can be in communications with a cellular network 406 via cellular signals 404. For example, the cellular signals 404 can utilize a predefined communication protocol, such as CDMA, GSM, or another wireless communication protocol or standard.

The cellular network 406 includes a plurality of cellular towers, each tower providing wireless cellular signal coverage to a limited geographical area. The cellular network can be configured to carry both voice and data signals, and can be digital or analog. Each tower of the cellular network 406 can also transmit a local time for updating a clock on the mobile device 400. For example, the cellular network 406 can provide signal coverage to the mobile device 400 within a defined geographical area.

The mobile device 400 communicates with a wireless network server 408 over the cellular network 406. The wireless network server 408 provides communication and data services to the mobile device 400, including forwarding voice and data connections. For example, the wireless network server 408 can be as illustrated in FIG. 3.

The wireless network server 408 is in communications with a memory 410. The memory 410 can store data and information necessary to provide wireless services to the mobile device 400.

The server 408 can be in communications with a network 412. For example, the server 408 can be accessible to an administrator over the Internet. For example, the server 408 can access modules required to provide the game application 414 over the Internet, as discussed above.

The server 408 can be in communications with an ad data store 416. The ad data store 416 can be configured to store one or more advertisements for transmission to the mobile device 400, as discussed. The ad data store 416 can also store metadata and other information to help the server 408 select a relevant ad based on sensor readings received from the mobile device 400.

Figure 5:
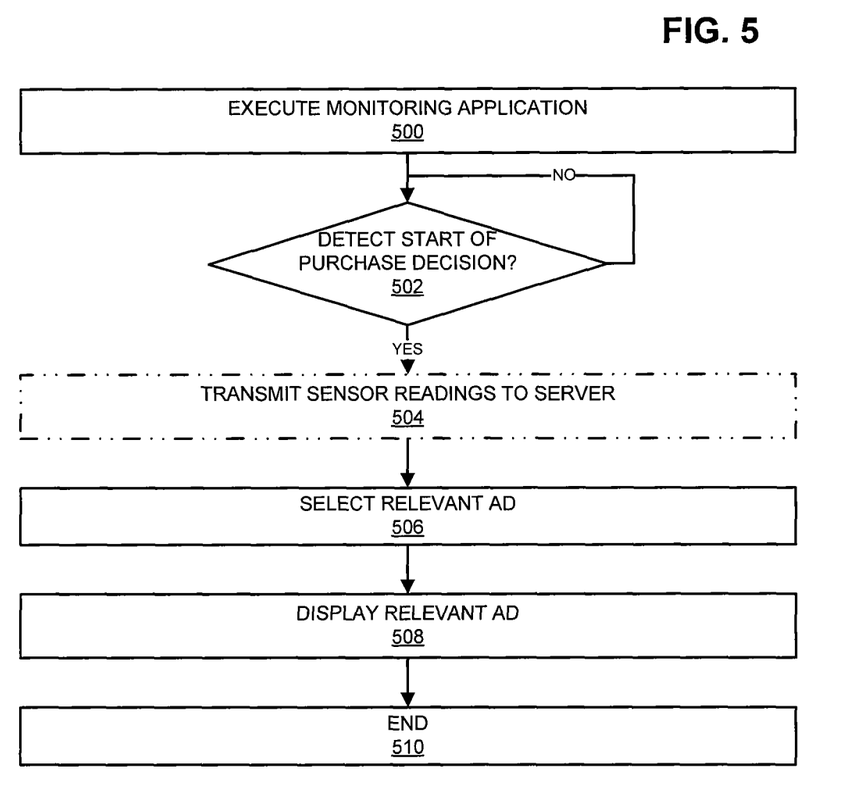
FIG. 5 illustrates an example procedure for improved mobile device advertising.

FIG. 5 illustrates an example procedure for improved mobile device advertising. The procedure can execute on a mobile device as illustrated in FIG. 2, a server as illustrated in FIG. 3, or a system as illustrated in FIG. 4. The procedure can detect a start of a user purchase decision making process, select a relevant ad, and display the relevant ad at a crucial point in the user decision making process to influence the user decision. This improves an effectiveness of the displayed ad by increasing ad relevancy.

In 500, the procedure executes a monitoring application at a mobile device. The monitoring application can be stored as computer-readable instructions configured to execute the application on a mobile device CPU. The monitoring application can execute as a daemon in the background of the mobile device's operating system and monitor mobile device sensor readings. Example mobile device sensors include a clock, an accelerometer, a location-detection module, etc. as discussed.

In 502, the procedure detects a start of a purchase decision making process via the mobile device sensor readings. The sensor readings can be interpreted as discussed above. A purchase decision making process can be inferred to start as discussed above. In an alternative embodiment, the sensor readings can be interpreted to determine a crucial point in the decision making process, when the user is receptive to a relevant ad. For example, if the user decides to visit a first car dealership, a relevant ad can be for a nearby second car dealership with similar vehicles. For example, if the user calls a friend who is an expert in sporting equipment, a relevant ad can be for a nearby sporting goods store.

If the process has started, the procedure proceeds to 504. If the process has not started, the procedure remains at 502.

In 504, the procedure optionally transmits sensor readings to the server. As discussed above, in one example embodiment, the sensor readings are wirelessly transmitted to the server. This allows the server to select a relevant ad from an ad data store. This minimizes the amount of storage and computing resources required by the mobile device.

In 506, the procedure selects a relevant ad based on the sensor readings. In one example embodiment, the relevant ad is selected by the mobile device from among ads stored locally. In another example embodiment, the relevant ad is selected by a server. As discussed above, the sensor readings are interpreted to determine the user's decision making process.

In 508, the procedure displays the relevant ad. The relevant ad can be displayed on a mobile device display screen, as illustrated in FIGS. 1A and 1B. The mobile device can output a notification, such as an audible beep or a vibration to let the user know a relevant ad is available for viewing.

The user can interact with the relevant ad, for example, by following a link to a webpage. The user can also utilize the information in the relevant ad, such as an offer code, at a merchant's location. In another embodiment, the relevant ad can include multimedia content that interacts with the user.

In 510, the procedure ends.

Figure 6A:
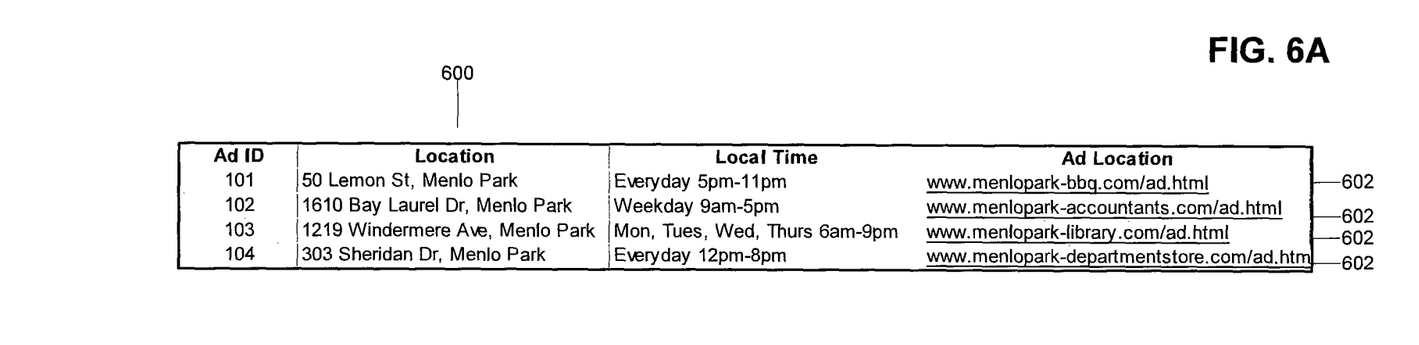
FIG. 6A illustrates an example data structure for storing ads in a data store.

FIG. 6A illustrates an example data structure for storing ads in a data store. A data structure 600 can be stored in a data store stored in an accessible memory and store multimedia ads for transmission to a mobile device. In another embodiment, the data structure 600 can be stored on the mobile device.

The data structure 600 can be saved in memory as a two-dimensional array, a linked list, a table, or any other data structure configured to store a set of entries. The data structure 600 can be stored in random access memory or saved to other rewritable or non-volatile memory.

The data structure can include one or more data entries 602. Each entry 602 can represent an ad.

Figure 6B:
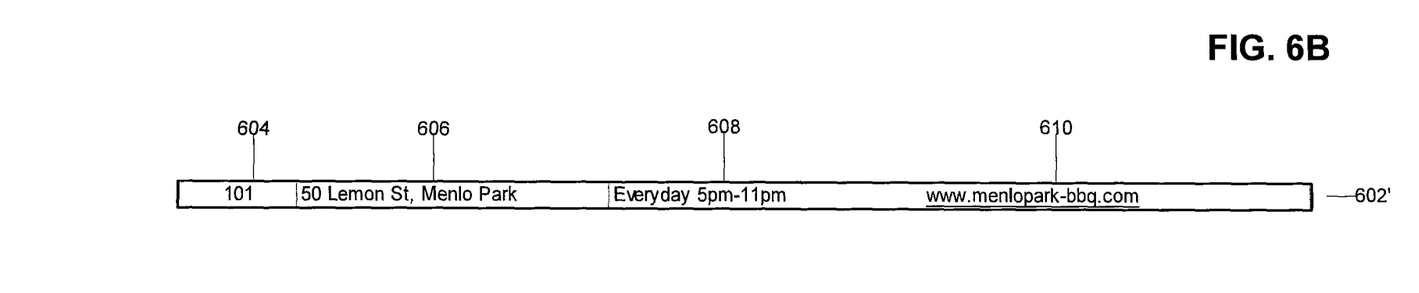
FIG. 6B illustrates an example data entry for storing ads in a data store.

FIG. 6B illustrates an example data entry for storing ads in a data store. Each entry 602' represents a multimedia file storing an ad.

Each entry 602' can include an ad identifier 604. The ad identifier 604 can be a globally unique identifier. The content identifier 604 can be used to identify each ad within memory. For example, the ad identifier 604 can be a sequence of alpha-numeric characters.

Each entry 602' can include a location relevancy 606. For example, the location relevancy 606 can be a street address, a set of longitude and latitude coordinates, or any other representation of a location. The location relevancy 606 can be used to determine when the ad is relevant to a user's physical location.

Each entry 602' can include a local time relevancy 608. For example, the local time relevancy 608 can be a period of time when the ad is relevant to a user. For example, a restaurant that only serves dinner is only relevant during dinner time.

Each entry 602' can include an ad location 610. For example, the content link 610 can be a URL address of a multimedia file that stores the ad for display. Alternatively, the entry 602' can store a multimedia file for the ad or a local address where the multimedia file is stored.

In addition, the entry 602' can include trigger conditions that define when the ad should be displayed. It will be appreciated that each entry 602' can include other fields, defined by programmer or user, to improve functionality and relevancy of the selected ads.

It can be appreciated that an embodiment of the present invention can be a method for displaying targeted advertisements. The method includes executing a monitoring application on a mobile device, the mobile device configured with a sensor. The method includes detecting a start of a user purchase decision making process via a sensor reading, wherein the sensor reading includes at least one of: a search query, a user command for the mobile device, a user geographical location, a local time, a user phone call, a user local environment, and a user behaviour history. The method includes selecting a relevant ad based on the start of the user purchase decision making process and the sensor reading. The method includes displaying the selected ad to the user during the user purchase decision making process. The ad can be an inducement for a similar product when the user is deciding to purchase a competing product. The ad can be for a recommended product related to the user purchase decision making process. An indication of the start of the user purchase decision making process and the sensor reading can be transmitted to a server. The sensor reading can be transmitted to a server, and the relevant ad can be selected by the server and transmitted to the mobile device for display. User identifiable information can be secured via encryption. The ad can be selected from a data store of pre-approved ads.

Another embodiment of the present invention can be a system for displaying targeted advertisements. The system can include a processor. The processor can be configured to execute a monitoring application on a mobile device, the mobile device configured with a sensor. The processor can be configured to detect a start of a user purchase decision making process via a sensor reading, wherein the sensor reading includes at least one of: a search query, a user command for the mobile device, a user geographical location, a local time, a user phone call, a user local environment, and a user behaviour history. The processor can be configured to select a relevant ad based on the start of the user purchase decision making process and the sensor reading. The processor can be configured to display the selected ad to the user during the user purchase decision making process. The ad can be an inducement for a similar product when the user is deciding to purchase a competing product. The ad can be for a recommended product related to the user purchase decision making process. An indication of the start of the user purchase decision making process and the sensor reading can be transmitted to a server. The sensor reading can be transmitted to a server, and the relevant ad can be selected by the server and transmitted to the mobile device for display. User identifiable information can be secured via encryption. The ad can be selected from a data store of pre-approved ads.

Another embodiment of the present invention can be a computer-readable storage medium including instructions adapted to execute a method for displaying targeted advertisements. The method includes executing a monitoring application on a mobile device, the mobile device configured with a sensor. The method includes detecting a start of a user purchase decision making process via a sensor reading, wherein the sensor reading includes at least one of: a search query, a user command for the mobile device, a user geographical location, a local time, a user phone call, a user local environment, and a user behaviour history. The method includes selecting a relevant ad based on the start of the user purchase decision making process and the sensor reading. The method includes displaying the selected ad to the user during the user purchase decision making process. The ad can be an inducement for a similar product when the user is deciding to purchase a competing product. The ad can be for a recommended product related to the user purchase decision making process. An indication of the start of the user purchase decision making process and the sensor reading can be transmitted to a server. The sensor reading can be transmitted to a server, and the relevant ad can be selected by the server and transmitted to the mobile device for display. User identifiable information can be secured via encryption. The ad can be selected from a data store of pre-approved ads.

The specific embodiments described in this document represent examples or embodiments of the present invention, and are illustrative in nature rather than restrictive. In the above description, for purposes of explanation, numerous specific details are set forth in order to provide a thorough understanding of the invention. It will be apparent, however, to one skilled in the art that the invention can be practiced without these specific details.

Reference in the specification to "one embodiment" or "an embodiment" or "some embodiments" means that a particular feature, structure, or characteristic described in connection with the embodiment is included in at least one embodiment of the present invention. Features and aspects of various embodiments may be integrated into other embodiments, and embodiments illustrated in this document may be implemented without all of the features or aspects illustrated or described. It will be appreciated to those skilled in the art that the preceding examples and embodiments are exemplary and not limiting.

While the system, apparatus and method have been described in terms of what are presently considered to be the most practical and effective embodiments, it is to be understood that the disclosure need not be limited to the disclosed embodiments. It is intended that all permutations, enhancements, equivalents, combinations, and improvements thereto that are apparent to those skilled in the art upon a reading of the specification and a study of the drawings are included within the true spirit and scope of the present invention. The scope of the disclosure should thus be accorded the broadest interpretation so as to encompass all such modifications and similar structures. It is therefore intended that the application includes all such modifications, permutations and equivalents that fall within the true spirit and scope of the present invention.

What is claimed is:

1. A method for displaying targeted advertisements, comprising:
   executing a monitoring application on a mobile device, the mobile device configured with a sensor;
   detecting a start of a user purchase decision making process via a sensor reading, wherein the sensor reading includes a user phone call;
   selecting a relevant ad based on the start of the user purchase decision making process and the sensor reading;
   displaying the selected ad to the user during the user purchase decision making process.

2. The method of claim 1, wherein the ad is an inducement for a similar product when the user is deciding to purchase a competing product.

3. The method of claim 1, wherein the ad is for a recommended product related to the user purchase decision making process.

4. The method of claim 1, wherein an indication of the start of the user purchase decision making process and the sensor reading is transmitted to a server.

5. The method of claim 4, wherein
   the sensor reading is transmitted to a server, and
   the relevant ad is selected by the server and transmitted to the mobile device for display.

6. The method of claim 5, where user identifiable information is secured via encryption.

7. The method of claim 1, wherein the ad is selected from a data store of pre-approved ads and each of the pre-approved ads includes a corresponding data entry, the data entry includes trigger conditions defined by the user.

8. A system for displaying targeted advertisements, comprising:
   a processor, the processor configured to
      execute a monitoring application on a mobile device, the mobile device configured with a sensor,
      detect a start of a user purchase decision making process via a sensor reading, wherein the sensor reading includes a user phone call,
      select a relevant ad based on the start of the user purchase decision making process and the sensor reading,
      determine if trigger conditions defined by the user and included in a data entry corresponding to the relevant ad are met; and
      displaying the selected ad to the user during the user purchase decision making process.

9. The system of claim 8, wherein the ad is an inducement for a similar product when the user is deciding to purchase a competing product.

10. The system of claim 8, wherein the ad is for a recommended product related to the user purchase decision making process.

11. The system of claim 8, wherein an indication of the start of the user purchase decision making process and the sensor reading is transmitted to a server.

12. The system of claim 11, wherein
   the sensor reading is transmitted to a server, and
   the relevant ad is selected by the server and transmitted to the mobile device for display.

13. The system of claim 12, where user identifiable information is secured via encryption.

14. The system of claim 8, wherein the ad is selected from a data store of preapproved ads and each of the pre-approved ads includes the corresponding data entry, the data entry includes the trigger conditions.

15. A computer-readable storage medium including instructions adapted to execute a method for displaying targeted advertisements, comprising:
   executing a monitoring application on a mobile device, the mobile device configured with a sensor;
   detecting a start of a user purchase decision making process via a sensor reading, wherein the sensor reading includes a user phone call;
   selecting a relevant ad based on the start of the user purchase decision making process and the sensor reading;
   determining if trigger conditions included in a data entry are met; and
   displaying the selected ad to the user during the user purchase decision making process.

16. The medium of claim 15, wherein the ad is an inducement for a similar product when the user is deciding to purchase a competing product.

17. The medium of claim 15, wherein the ad is for a recommended product related to the user purchase decision making process and the ad is selected from a data store of pre-approved ads and each of the pre-approved ads includes the corresponding data entry, and wherein the trigger conditions are defined by the user.

18. The medium of claim 15, wherein an indication of the start of the user purchase decision making process and the sensor reading is transmitted to a server.

19. The medium of claim 18, wherein
   the sensor reading is transmitted to a server, and
   the relevant ad is selected by the server and transmitted to the mobile device for display.

20. The medium of claim 19, where user identifiable information is secured via encryption.

* * * * *